US012405392B1

(12) United States Patent
Dervishi-Whetham et al.

(10) Patent No.: US 12,405,392 B1
(45) Date of Patent: Sep. 2, 2025

(54) ELECTROPLATED MATERIALS AND ARRAY DESIGN FOR SCINTILLATORS

(71) Applicant: Triad National Security, LLC, Los Alamos, NM (US)

(72) Inventors: Enkeleda Dervishi-Whetham, Los Alamos, NM (US); Randall Lynn Edwards, Los Alamos, NM (US); Michael Anthony McBride, Los Alamos, NM (US); Daniel Edwin Hooks, Los Alamos, NM (US)

(73) Assignee: Triad National Security, LLC, Los Alamos, TX (US)

( * ) Notice: Subject to any disclaimer, the term of this patent is extended or adjusted under 35 U.S.C. 154(b) by 96 days.

(21) Appl. No.: 18/139,082

(22) Filed: Apr. 25, 2023

Related U.S. Application Data

(60) Provisional application No. 63/337,973, filed on May 3, 2022.

(51) Int. Cl.
*G01T 1/20* (2006.01)
*G01T 1/202* (2006.01)

(52) U.S. Cl.
CPC .................. *G01T 1/2023* (2013.01)

(58) Field of Classification Search
CPC .................................................. G01T 1/2023
See application file for complete search history.

(56) References Cited

U.S. PATENT DOCUMENTS

| | | | |
|---|---|---|---|
| 3,285,839 A | 11/1966 | Camp et al. | |
| 5,949,850 A * | 9/1999 | Tang | G03F 7/0007 378/154 |
| 6,060,713 A | 5/2000 | Skillicorn et al. | |
| 6,298,113 B1 * | 10/2001 | Duclos | G01T 1/202 378/19 |
| 6,534,772 B1 * | 3/2003 | Chhabra | G01T 1/2921 977/890 |
| 7,238,945 B2 | 7/2007 | Hoffman et al. | |
| 2003/0123615 A1 * | 7/2003 | Klausz | G21K 1/025 378/154 |
| 2003/0128813 A1 * | 7/2003 | Appleby | B29C 69/001 378/147 |
| 2004/0156478 A1 * | 8/2004 | Appleby | B29C 33/302 264/318 |
| 2004/0251420 A1 * | 12/2004 | Sun | G01T 1/20183 250/370.09 |

(Continued)

OTHER PUBLICATIONS

Brian A. Rosen et al., "Microstructure and composition of pulse plated Re-Ni alloys on a rotating cylinder electrode," Journal of Electroanalytical Chemistry, 731:93, (2014).

(Continued)

*Primary Examiner* — Hugh Maupin
(74) *Attorney, Agent, or Firm* — ALSTON & BIRD LLP

(57) ABSTRACT

Embodiments provide for scintillator grid array and a method of manufacturing the same. An example method includes preparing a plurality of substrates each comprising a first material, depositing a layer of a second material onto each of the plurality of substrates to produce a plurality of (Continued)

electroplated substrates, pressing the plurality of electroplated substrates into a grid array, dissolving the first material from the electroplated substrates of the grid array, and placing scintillator crystals into the grid array.

18 Claims, 8 Drawing Sheets

(56) References Cited

U.S. PATENT DOCUMENTS

| | | | |
|---|---|---|---|
| 2005/0003295 A1* | 1/2005 | Koninckx | C09K 11/7733 |
| | | | 430/139 |
| 2006/0202125 A1* | 9/2006 | Suhami | G01T 1/202 |
| | | | 250/368 |
| 2007/0246663 A1* | 10/2007 | Tahon | G21K 4/00 |
| | | | 250/484.4 |
| 2007/0269015 A1* | 11/2007 | Raber | H01J 35/105 |
| | | | 378/144 |
| 2008/0088059 A1* | 4/2008 | Tang | G21K 1/025 |
| | | | 264/261 |
| 2009/0014662 A1* | 1/2009 | Suhami | G01T 3/06 |
| | | | 250/390.11 |
| 2010/0127180 A1* | 5/2010 | Lifshitz | H10F 39/1898 |
| | | | 438/73 |
| 2011/0110490 A1 | 5/2011 | Samant et al. | |
| 2014/0158543 A1* | 6/2014 | Chen | C25D 11/045 |
| | | | 205/73 |
| 2014/0241493 A1* | 8/2014 | Yokoyama | C25D 7/123 |
| | | | 378/147 |
| 2015/0243397 A1* | 8/2015 | Yun | A61B 6/484 |
| | | | 378/36 |
| 2016/0187500 A1* | 6/2016 | Wang | G01T 1/20185 |
| | | | 156/257 |
| 2017/0040076 A1* | 2/2017 | Yokoyama | B81C 1/00571 |
| 2022/0359128 A1* | 11/2022 | Tedde | H01G 9/0036 |

OTHER PUBLICATIONS

C.L. Melcher, "Perspectives on the future development of new scintillators," Nuclear Instruments and Methods in Physics Research A, 537:6-14, (2005).

Colin G. Fink et al., "Rhenium Plating," Transactions of the Electrochemical Society, 66:471-747, (1934).

D. Landolt, "Electrochemical and Materials Science Aspects of Alloy Deposition," Electrochimica Acta, 39(8/9):1075-1090, (1994).

D. Landolt, "Electrodeposition Science and Technology in the Last Quarter of the Twentieth Century," Journal of the Electrochemical Society, 149(3):S9-S20, (2002).

Eagle Engineering, "Mini Barrel Units—Electroplating Equipment", retrieved from the Internet at <https://web.archive.org/web/20220129110822/https://www.platingbarrels.com/mini-plating-barrels> on Mar. 21, 2025, 2 pages.

L.B. Hunt, "The Early History of Gold Plating," Gold Bulletin, 6:16-27, (1973).

Matthew Lowdon et al., "Evaluation of Scintillator Detection Materials for Application within Airborne Environmental Radiation Monitoring," Sensors, 19:3828, (2019).

Singleton Corporation, "Plating: Mini Barrels & Plating Baskets", retrieved from the Internet at <https://web.archive.org/web/20220127232524/https://singletoncorp.com/plating-mini-barrels-plating-baskets> on Mar. 21, 2025, 2 pages.

Tzippora Nusbaum et al., "Effect of Pulse On-Time and Peak Current Density on Pulse Plated Re-Ni Alloys," J. Electrochem. Soc., 162(7):D250-D255, (2015).

Walter Giurlani et al., "Electroplating for Decorative Applications: Recent Trends in Research and Development," Coatings, 8:260, (2018).

William W. Moses, "Current trends in scintillator detectors and materials," Nuclear Instruments and Methods in Physics Research A, 487:123-128, (2002).

* cited by examiner

ELECTROPLATED MATERIALS AND ARRAY DESIGN FOR SCINTILLATORS

CROSS-REFERENCE TO RELATED APPLICATIONS

The present application claims priority to U.S. Provisional Application Ser. No. 63/337,973, titled "ELECTROPLATED MATERIALS AND ARRAY DESIGN FOR SCINTILLATORS," filed May 3, 2022, the contents of which are incorporated herein by reference in their entirety.

ACKNOWLEDGMENT OF GOVERNMENT SUPPORT

This invention was made with government support under 89233218CNA000001 awarded by the U.S. Department of Energy. The government has certain rights in the invention.

FIELD

The present application is generally directed to the field of scintillators, and, more particularly, to electroplated materials and array designs for scintillators.

BACKGROUND

Scintillators are a group of materials that luminesce when exposed to ionizing radiation. Scintillator materials emit light when they absorb particles or electromagnetic waves that create free electrons in the material. Scintillation imaging grids with improved resolution in time and space, may be preferable for various applications. Technologies for various detectors (e.g., gamma-ray detection) may involve the use of inorganic crystal scintillators, such as Lutetium oxyorthosilicate (Lu2SiO5:Ce, or LSO), positioned within a high impedance (or high-Z) scintillator septa array. However, the resolution of standard chemical etching and fabrication processes of high-Z materials (e.g., tungsten (W)) is very low, leading to undesired undercutting and ultimately reducing performance efficiency of the detectors. Furthermore, traditional etching routes involve highly toxic and hazardous solutions such as hydrogen fluoride (HF), and they are not precise or controlled processes (e.g., undercutting features). Hence, traditional etching routes are difficult to adapt for large-scale applications.

Through applied effort, ingenuity, and innovation, many of these identified problems have been solved by developing solutions that are included in embodiments of the present disclosure, many examples of which are described in detail herein.

SUMMARY

Embodiments provide for an apparatus. In embodiments, the apparatus comprises a plurality of electroplated substrates pressed into a grid array and scintillator crystals in the grid array. In some of these embodiments, each electroplated substrate of the plurality of electroplated substrates comprises a substrate comprising first material and a layer of a second material deposited onto the substrate. In some of these embodiments, the first material is dissolved from each electroplated substrate prior to the scintillator crystals being placed into the grid array. In some of these embodiments, the first material comprises steel, metal, or a non-metal material.

In some of these embodiments, the second material comprises one of gold, bismuth, rhenium, or a rhenium nickel alloy.

In some of these embodiments, the substrate further comprises a layer of a third material deposited on the first material before the second material is deposited onto the substrate. In some of these embodiments, the third material comprises nickel.

In some of these embodiments, pressing the plurality of electroplated substrates into the grid array comprises positioning the plurality of electroplated substrates within a hot isostatic pressing can and hot isostatic pressing the plurality of electroplated substrates. In some of these embodiments, the hot isostatic press can comprises a shape and dimensions particular to an application for which the grid array with the scintillator crystals will be used.

In some of these embodiments, the scintillator crystals comprise Lutetium Oxyorthosciilicate (Ce) (LSO).

Embodiments further provide for a method of manufacturing a scintillator grid array. The example method includes preparing a plurality of substrates each comprising a first material. The method further includes depositing a layer of a second material onto each of the plurality of substrates to produce a plurality of electroplated substrates. The method further includes fusing the plurality of electroplated substrates together by hot isostatic pressing the plurality of electroplated substrates into a grid array. The method further includes dissolving the first material from the electroplated substrates of the grid array, and placing scintillator crystals into the grid array.

In some of these embodiments, the depositing of the layer of the second material onto each of the plurality of substrates comprises electroplating.

In some of these embodiments, the first material comprises steel, a non-metal material, or metal. In some of these embodiments, the second material comprises one of gold, rhenium, bismuth, or a rhenium nickel alloy.

In some of these embodiments, the step of pressing the plurality of electroplated substrates into a grid array comprises positioning the plurality of electroplated substrates within a hot isostatic pressing can and hot isostatic pressing the plurality of electroplated substrates. In some of these embodiments, the step of pressing the plurality of electroplated substrates into a grid array comprises exposing the hot isostatic pressing can to elevated temperature and pressure.

In some of these embodiments, the hot isostatic pressing can is welded closed prior to being exposed to the elevated temperature and pressure.

In some of these embodiments, the method further includes the step of dissolving the hot isostatic pressing can from the grid array after hot isostatic pressing is completed. In some of these embodiments, the step of dissolving the hot isostatic pressing can comprises soaking the hot isostatic pressing can in a nitric acid solution.

In some of these embodiments, the step of dissolving the first material from the electroplated substrates comprises etching. In some of these embodiments, the etching comprises a heated nitric acid bath.

In some of these embodiments, the method further includes the step of exposing ends of the grid array before dissolving the first material. In some of these embodiments, the step of exposing the ends of the grid array comprises electrical discharge machining.

In some of these embodiments, the scintillator crystals comprise Lutetium Oxyorthosciilicate (Ce) (LSO).

In some of these embodiments, the method further includes the step of using the grid array with the scintillator crystals positioned therein in a detection or imaging device.

In some of these embodiments, the method further includes the step of depositing a layer of a third material onto the first material prior to depositing the second material onto the plurality of substrates. In some of these embodiments, the third material comprises nickel.

In some of these embodiments, the hot isostatic press can comprise a shape and dimensions particular to an application for which the grid array with the scintillator crystals will be used. In some of these embodiments, the hot isostatic press can is manufactured using either electrical discharge machining or metal sheet forming. In some of these embodiments, the hot isostatic press can is cleaned using potassium cyanide, potassium hydroxide, and water.

The details of one or more embodiments of the subject matter described in this specification are set forth in the accompanying drawings and the description below.

Other features, aspects, and advantages of the subject matter will become apparent from the description, the drawings, and the claims.

BRIEF DESCRIPTION OF THE DRAWINGS

Figure 1:
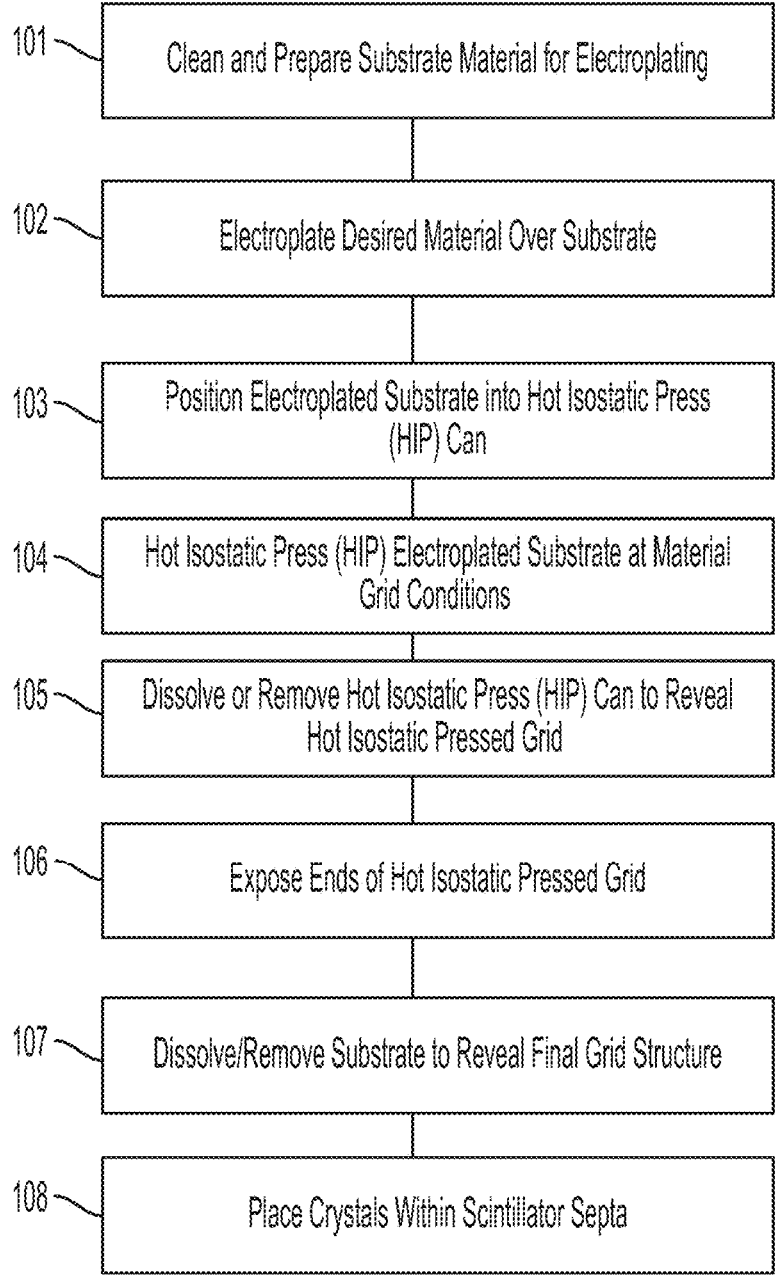

Having thus described the disclosure in general terms, reference will now be made to the accompanying drawings, which are not necessarily drawn to scale, and wherein:

FIG. 1 depicts an example scintillator grid manufacturing process, in accordance with embodiments of the present disclosure.

Figure 2A:
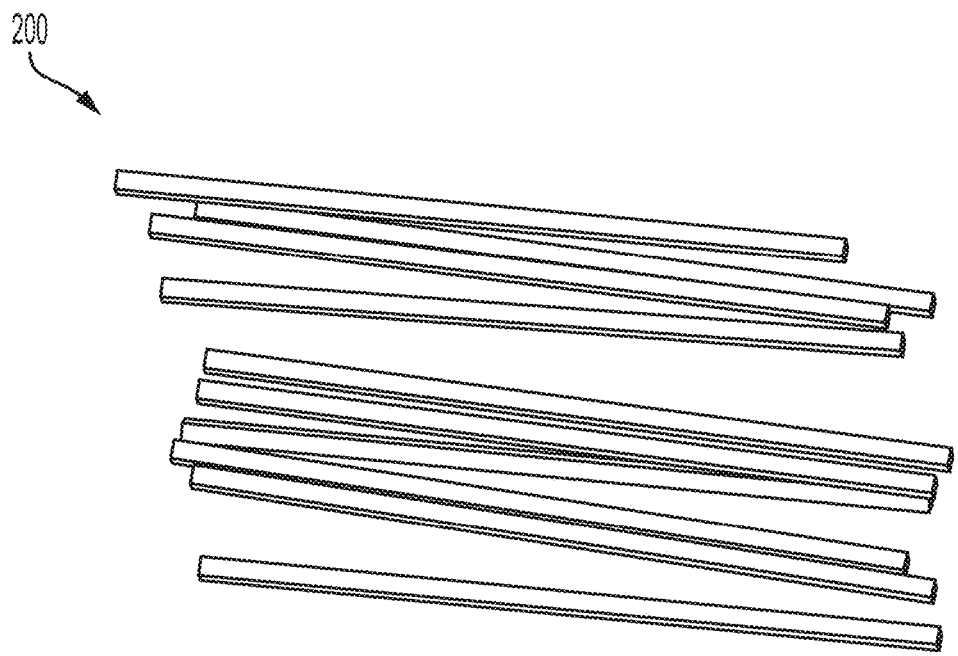

FIG. 2A depicts example scintillator-geometry wires, in accordance with embodiments of the present disclosure.

Figure 2B:
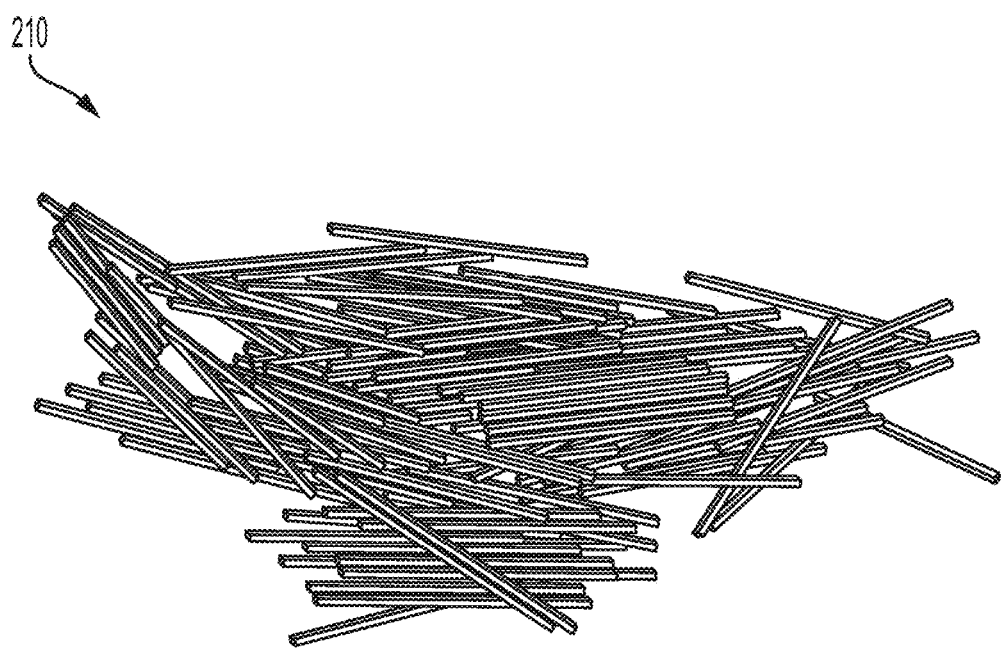

FIG. 2B depicts example electroplated scintillator-geometry wires, in accordance with embodiments of the present disclosure.

Figure 2C:
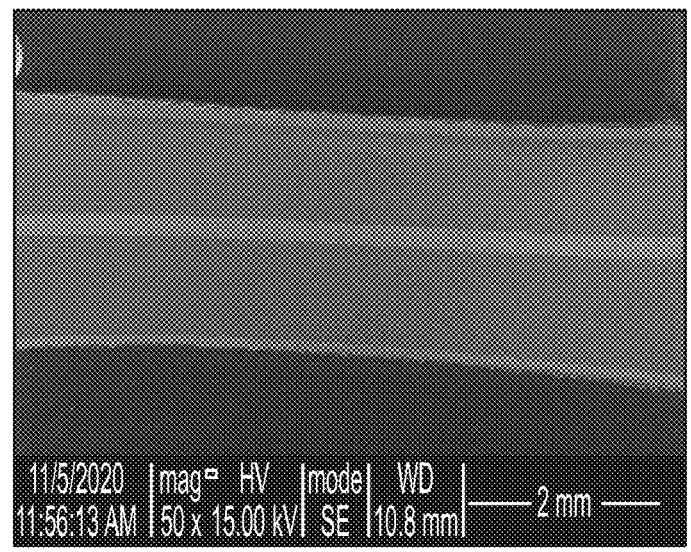

FIG. 2C depicts an SEM image of cross-sectioned bonded wire pieces, in accordance with embodiments of the present disclosure.

Figure 2D:
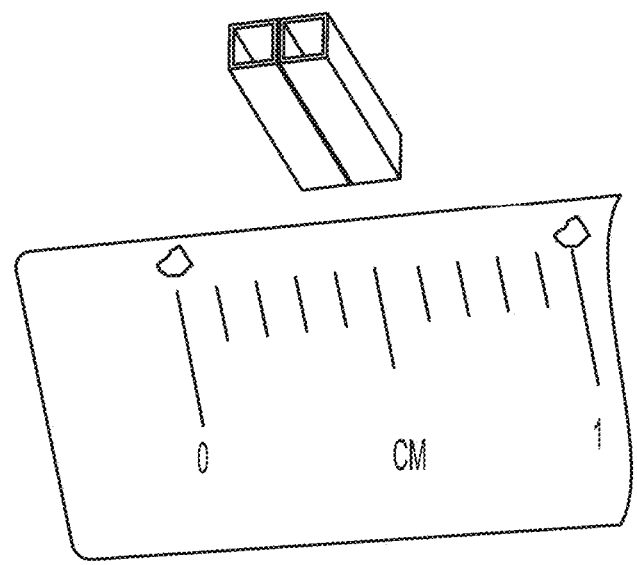

FIG. 2D depicts bonded electroplated wires after substrate dissolution.

Figure 3A:
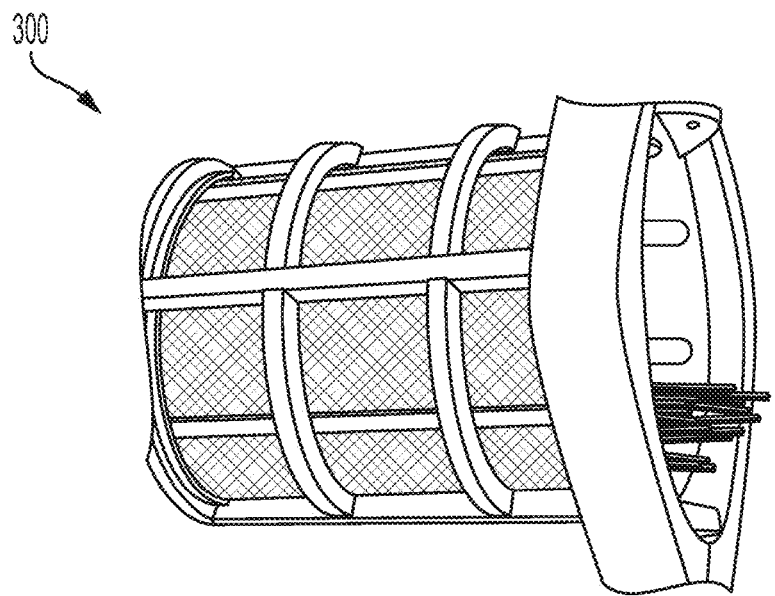
Figure 3B:
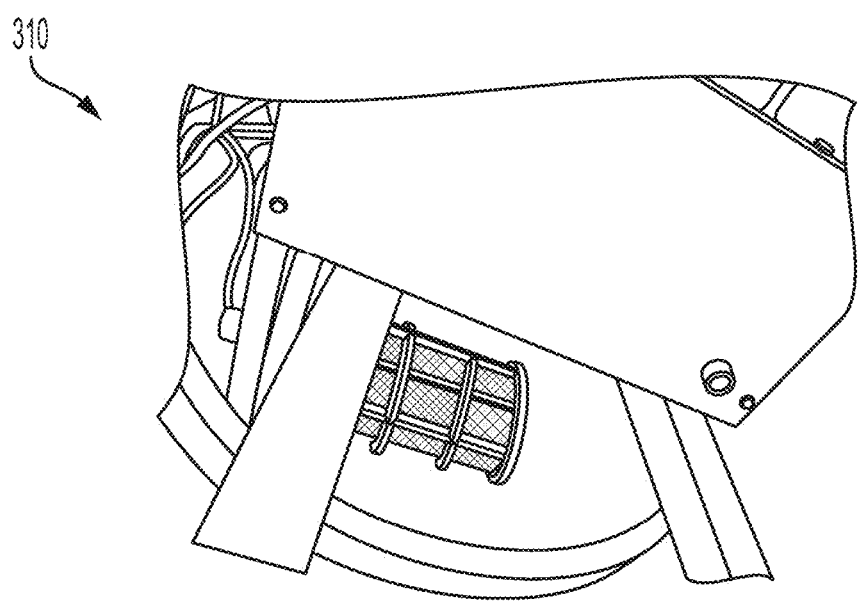

FIGS. 3A and 3B depict an example barrel basket used for electroplating, in accordance with embodiments of the present disclosure.

Figure 4:
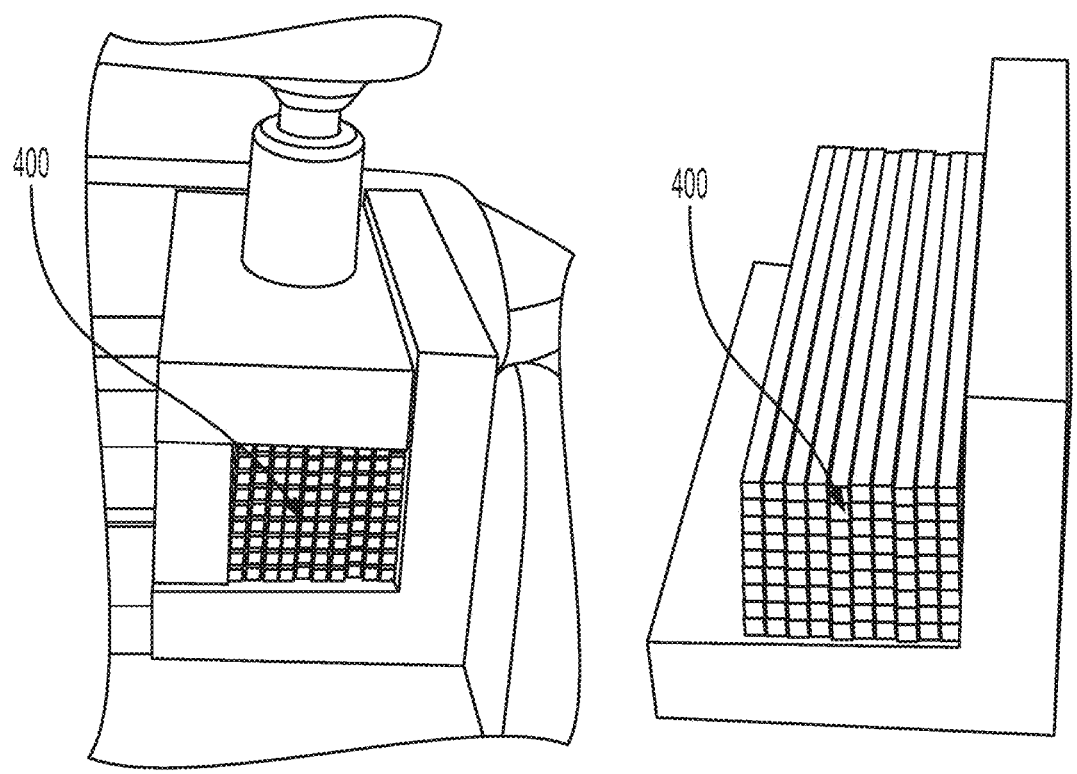

FIG. 4 depicts an example wire bonded scintillator septa before substrate dissolution, in accordance with embodiments of the present disclosure.

Figure 5:
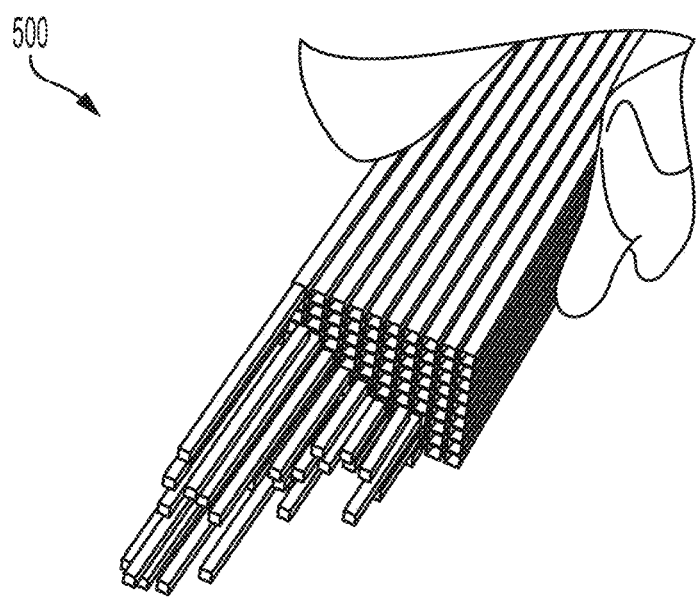

FIG. 5 depicts an example wire bonded scintillator septa after substrate dissolution, in accordance with embodiments of the present disclosure.

Figure 6:
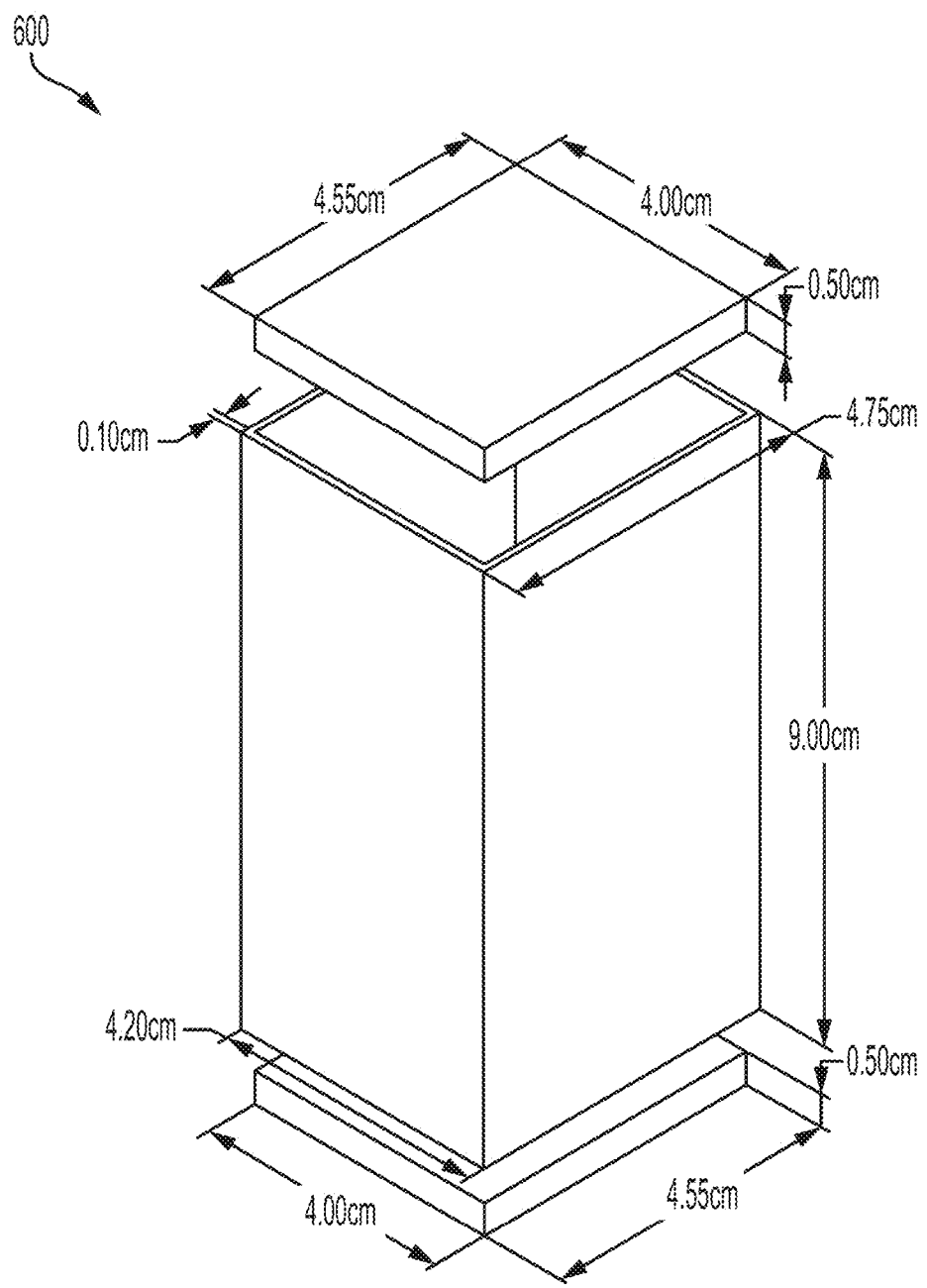

FIG. 6 depicts an example hot isostatic press (HIP) can, in accordance with embodiments of the present disclosure.

Figure 7:
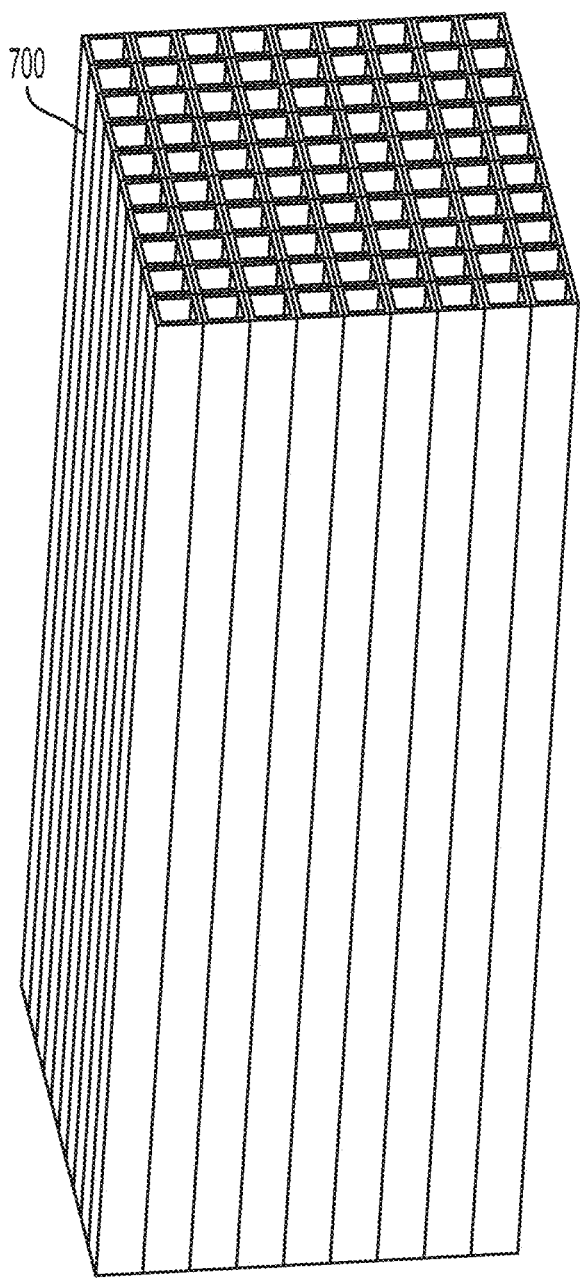

FIG. 7 depicts an example small-scale scintillator grid, in accordance with embodiments of the present disclosure.

Figure 8:
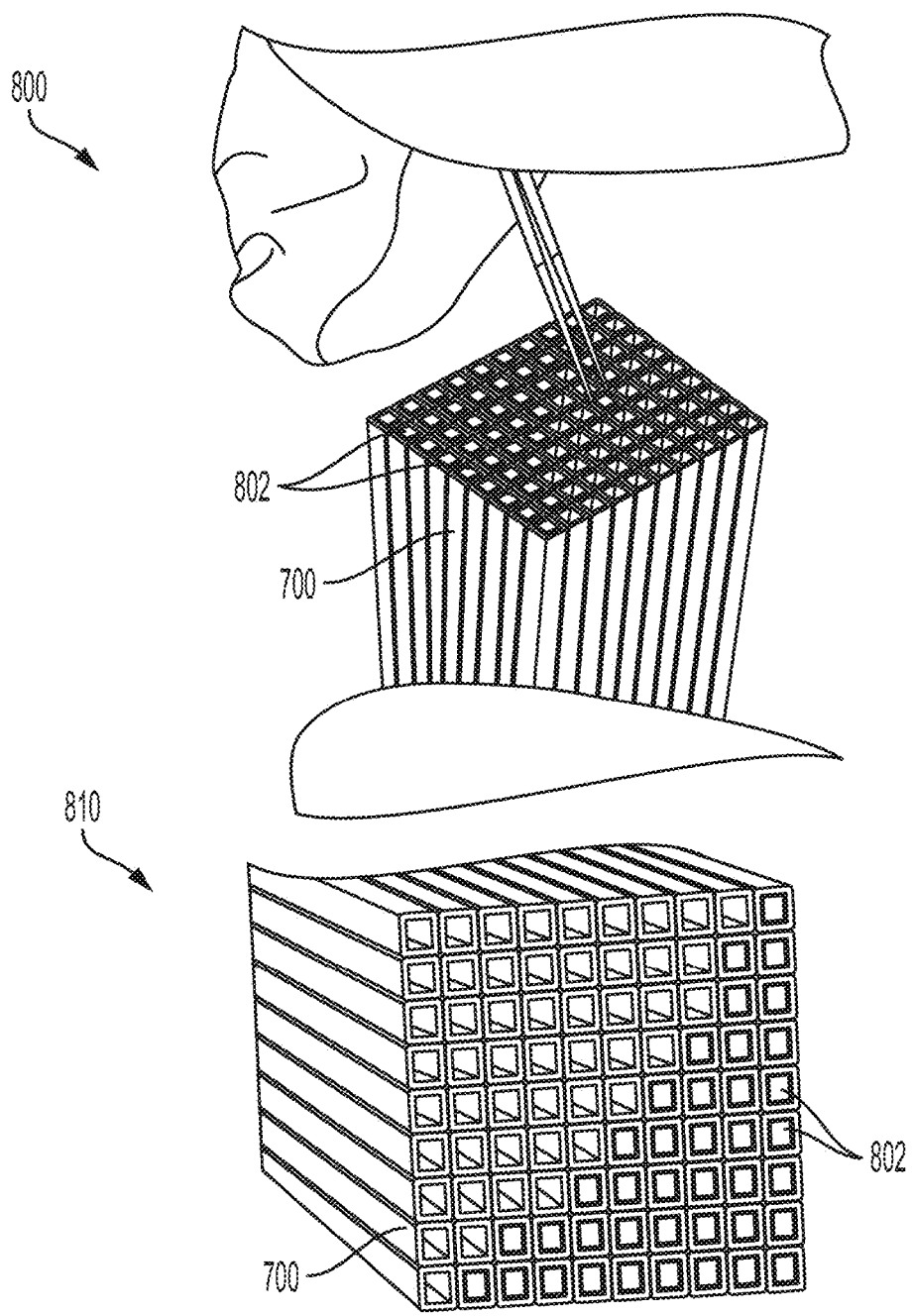

FIG. 8 depicts example crystals positioned within an example small-scale scintillator grid, in accordance with embodiments of the present disclosure.

DETAILED DESCRIPTION

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Dense and high impedance (high-Z) materials, which are optimal for gamma-ray detection, are promising candidates for development of high-performance and high-precision scintillator grids. Materials like rhenium (Re) and gold (Au) are highly desirable because of their high-Z, and their ability to be electroplated. Electroplating or electroforming is a mature metallic coating process, widely employed for a number of functional and decorative applications in industry. Electroplating involves deposition of metal over the desired substrate surfaces resulting in a homogenous, well-defined, conformal coating, which can be scaled-up for large scale applications at low cost.

High precision scintillation grids are essential for current and future detection or imaging devices with high imaging resolution in time and space. However, their performance can be limited by the materials used for fabrication and design. Existing imaging technologies use inorganic crystal scintillators, positioned within a high-Z metallic scintillator septa array. Materials used for the metallic grids are etched into specific arrays via standard etching techniques, which involve highly toxic and hazardous solutions and suffer from a low resolution. This leads to undesired undercutting, reduces the crystal performance efficiency, and can limit the size of the scintillator grid.

Embodiments herein are directed to improved methods and apparatuses for the production of large-scale scintillator grids from high-Z materials (and/or combination of two different metals) with micron scale precision using electrochemical deposition methods coupled with a hot isostatic pressing (HIP) technique. Materials are electroplated over specific substrates for fabrication of scintillator devices, which can be used for detection of gamma-rays, X-rays, and the like. Dense and high-Z materials (e.g., Au and Re) are deposited via electroplating over a substrate (e.g., stainless and/or mild steel) with specific dimensions for a scintillation septa. The electroplated pieces are then fused together via a HIP process at the required metal temperature. Subsequently, the substrate can be dissolved, leaving behind the scintillator grid array. Precision electroplating/electroforming coupled with the HIP process enable the delivery of next-generation scintillator grids with unprecedented accuracy, minimized material loss during processing, and safer chemicals.

Embodiments herein, while applicable to Re and Au, are also applicable to other metals and alloys (e.g., Re and nickel (Ni)) that can be electroplated via aqueous or non-aqueous media over a wide range of substrates. Furthermore, the HIP process used herein can be tailored to the required scintillator material and dimensions, making it attractive for large-scale device fabrication. Embodiments herein overcome current fabrication challenges and limitations for detectors with intricate and specific array dimensions through the design and fabrication of scintillation detector septa via electroplating scintillator-geometry substrate materials, diffusion bonding at elevated temperatures under high isostatic pressures, and a substrate dissolution.

Applications for embodiments herein include, but are not limited to, scintillator grids for imaging, medical imaging, radiation detectors, scintillation detectors, materials/devices for detections of different type of rays, materials/devices for imaging resolution type applications, applications in photonic and metamaterials of certain kinds (e.g., magnetic metamaterials), signal detection and modification, accelerators, oil exploration, and more.

Embodiments herein provide for starting with any shape scintillation element and using the scintillation element as a mandrel to coat individual scintillation pixels. The individual scintillation pixel can then be fused into any desired array. This provides the shape directly relevant to the detector needed according to the application. The bottom-up approach of embodiments herein is contrary to conventional methods in which the pixel elements are dissolved from a solid block. Thus, embodiments herein provide for a more accurate and flexible approach, and provides for materials in the grid that substantially increase the efficiency of the detector. Embodiments herein enable the production of any size and shape ending product, without limitations of the starting type and size of starting substrate.

FIG. 1 depicts an example scintillator grid manufacturing process, in accordance with embodiments of the present disclosure. An example process 100 includes cleaning and preparing 101 a substrate material for electroplating. In embodiments, the substrate material can be stainless steel wires, prepared according to a scintillator geometry, such as the example scintillator-geometry steel wires 200 depicted in FIG. 2A. In embodiments, cleaning and preparing 101 the substrate material includes cleaning the steel wire substrates (e.g., 200) in a degreaser (e.g., at 60° C.) for a first duration (e.g., 10 mins) and then rinsed with deionized water. They can next be dipped in a hydrochloric acid solution (50 vol %) for a second duration (e.g., 2 mins) and then rinsed with deionized water. A thick nickel (Ni) layer is applied using an electroless nickel (Ni) bath at 90° C. for a third duration (e.g., 10 mins) and then the wires are rinsed with deionized water.

The example process 100 continues with electroplating 102 the desired material over the substrate. In embodiments, the desired material can be rhenium (Re) or gold (Au). For example, electroplated scintillator-geometry wires 210 shown in FIG. 2B are electroplated with Au. In some embodiments, electroplating 102 the desired material over the substrate is accomplished using a barrel basket process (e.g., 300, 310), as shown in FIGS. 3A and 3B. The barrel basket 300, 310 is a non-conductive barrel shaped cage with the required volume or dimensions for large-scale electroplating. For gold electroplating, a potassium gold cyanide solution and a DC power supply can be used.

The example process 100 continued with positioning 103 the electroplated substrate (e.g., the electroplated scintillator-geometry wires 210) into a hot isostatic press (HIP) can. The hot isostatic press (HIP) can may have a shape and dimensions particular to the desired application, such as the example HIP can 600 depicted in FIG. 6. The HIP can may be made from mild steel via electrical discharge machining (EDM). EDM introduces impurities like copper (Cu), which might interfere with the welding process. Other techniques can be used to machine or manufacture the HIP can such as metal sheet forming. The HIP can may be cleaned in a copper (Cu) stripper solution made out of potassium cyanide, potassium hydroxide, and water. The HIP can is welded and evacuated after the electroplated substrates are placed into it.

The example process 100 continues with hot isostatic pressing 104 the electroplated substrates at appropriate conditions to bond the electroplated substrates to one another. The hot isostatic press (HIP) can be subjected to high pressure and temperatures. The HIP conditions (temperature and pressure) are dependent on the required grid material (e.g., the resulting grid structure).

Once the hot isostatic pressing 104 is completed, the example process 100 continues with removing 105 (e.g., or dissolving) the hot isostatic press can to reveal the grid. In embodiments, the HIP can is steel and is dissolved in nitric acid solution (50 vol %) to remove it from the grid. The resulting structure includes the electroplated substrates bonded together in the desired shape and configuration, such as the wire bonded scintillator septa 400 depicted in FIG. 4. An SEM image of cross-sectioned bonded wire pieces can be seen in FIG. 2C.

The example process 100 continues with exposing 106 the ends of the hot isostatic pressed grid. FIG. 4 depicts a wire bonded scintillator septa (e.g., hot isostatic pressed grid) 400 where the ends have not yet been exposed and where the substrate has not yet been dissolved. In embodiments, the ends are exposed using EDM.

The example process 100 continues with dissolving or removing 107 the substrate to reveal the final grid structure. In embodiments, etching is used to remove the substrate. In embodiments, a heated nitric acid bath is used to dissolve the steel wires. The final grid structure is rinsed in deionized water and dried thoroughly. An example wire bonded scintillator septa 500 after substrate dissolution is depicted in FIG. 5. FIG. 2D also depicts bonded electroplated wires after substrate dissolution. An example small-scale scintillator grid 700 is also depicted in FIG. 7, shown after substrate dissolution.

The example process 100 continues with positioning or placing 108 crystals within the scintillator septa. An example of crystals 802 positioned within an example small-scale scintillator grid 700 is depicted in FIG. 8 (e.g., 800, 810). In embodiments, the crystals are Lutetium oxyorthosciilicate (Ce) (or LSO) scintillator crystals.

It will be appreciated that, while embodiments herein are depicted with a particular size and shape, resulting apparatuses (e.g., arrays) from methods herein can have complex shapes, a wide range of sizes, and do not have to be flat or square in nature. Further, resulting apparatuses can be support structures or carriers.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method of manufacturing a scintillator grid array, the method comprising:
   preparing a plurality of substrates each comprising a first material;
   depositing a layer of a second material onto each of the plurality of substrates to produce a plurality of electroplated substrates;
   pressing the plurality of electroplated substrates into a grid array, wherein pressing the plurality of electroplated substrates into the grid array comprises:
      positioning the plurality of electroplated substrates within a hot isostatic pressing can;
      welding the hot isostatic pressing can closed; and
      hot isostatic pressing the plurality of electroplated substrates;
   dissolving the first material from the plurality of electroplated substrates of the grid array; and
   placing scintillator crystals into the grid array.

2. The method of claim 1, wherein depositing of the layer of the second material onto each of the plurality of substrates comprises electroplating.

3. The method of claim 1, wherein the first material comprises steel, a non-metal material, or metal and wherein the second material comprises one of gold, rhenium, bismuth, or a rhenium nickel alloy.

4. The method of claim 1, wherein pressing the plurality of electroplated substrates into the grid array further comprises exposing the hot isostatic pressing can to elevated temperature and pressure.

5. The method of claim 4, further comprising:
   dissolving the hot isostatic pressing can from the grid array after hot isostatic pressing is completed, and wherein dissolving the hot isostatic pressing can comprises soaking the hot isostatic pressing can in a nitric acid solution.

6. The method of claim 1, wherein dissolving the first material from the plurality of electroplated substrates comprises etching, and wherein the etching comprises a heated nitric acid bath.

7. The method of claim 1, further comprising exposing ends of the grid array before dissolving the first material, wherein exposing the ends of the grid array comprises electrical discharge machining.

8. The method of claim 1, wherein the scintillator crystals comprise Lutetium Oxyorthoscilicate(Ce) (LSO).

9. The method of claim 1, further comprising using the grid array with the scintillator crystals positioned therein in a detection or imaging device.

10. The method of claim 1, further comprising depositing a layer of a third material onto the first material prior to depositing the second material onto the plurality of substrates, wherein the third material comprises nickel.

11. The method of claim 1, wherein the hot isostatic pressing can comprises a shape and dimensions particular to an application for which the grid array with the scintillator crystals will be used.

12. The method of claim 11, wherein the hot isostatic pressing can is manufactured using either electrical discharge machining or metal sheet forming and wherein the hot isostatic pressing can is cleaned using potassium cyanide, potassium hydroxide, and water.

13. An apparatus, comprising:
   scintillator crystals in a grid array; and
   a plurality of electroplated substrates pressed into the grid array, wherein pressing the plurality of electroplated substrates into the grid array comprises positioning the plurality of electroplated substrates within a hot isostatic pressing can and hot isostatic pressing the plurality of electroplated substrates, and wherein the hot isostatic pressing can comprises a shape and dimensions particular to an application for which the grid array with the scintillator crystals will be used.

14. The apparatus of claim 13, wherein each electroplated substrate of the plurality of electroplated substrates comprises:
   a substrate comprising first material and a layer of a second material deposited onto the substrate.

15. The apparatus of claim 14, wherein the first material is dissolved from each electroplated substrate prior to the scintillator crystals being placed into the grid array.

16. The apparatus of claim 14, wherein the first material comprises steel, metal, or a non-metal material, and wherein the second material comprises one of gold, bismuth, rhenium, or a rhenium nickel alloy.

17. The apparatus of claim 14, wherein the substrate further comprises a layer of a third material deposited on the first material before the second material is deposited onto the substrate and wherein the third material comprises nickel.

18. The apparatus of claim 13, wherein the scintillator crystals comprise Lutetium Oxyorthoscilicate (Ce) (LSO).

* * * * *